United States Patent [19]

Parker et al.

[11] 4,198,138
[45] Apr. 15, 1980

[54] AUTOMATIC FOCUSING SYSTEM FOR PROJECTORS

[75] Inventors: Robert R. Parker, Wheeling; Nicholas Mischenko, Mt. Prospect, both of Ill.

[73] Assignee: Bell & Howell Company, Chicago, Ill.

[21] Appl. No.: 897,879

[22] Filed: Apr. 19, 1978

[51] Int. Cl.$^2$ .............................................. G03B 21/22
[52] U.S. Cl. ...................................... 353/71; 353/101
[58] Field of Search ................................. 353/101, 71

[56] References Cited

U.S. PATENT DOCUMENTS

| | | | |
|---|---|---|---|
| 3,249,006 | 5/1966 | Stauffer | 353/101 |
| 3,517,992 | 6/1970 | Holle | 353/101 |
| 3,628,863 | 12/1971 | Kottler et al. | 353/101 |
| 4,030,821 | 6/1977 | Badalich | 353/101 |

Primary Examiner—Steven L. Stephan
Attorney, Agent, or Firm—Robert J. Schneider; Roger M. Fitz-Gerald

[57] ABSTRACT

The present invention provides a system for automatically focusing a projected film image by maintaining a predetermined distance along the optical axis between the emulsion on the surface of the film and the projection lens. The system includes a movable carriage for mounting the projection lens and an electro-optic sensor mounted for movement with the carriage for maintaining the predetermined distance. The electro-optic scanner includes a light source and lens assembly for focusing a beam of light onto the surface of the film and a lens for focusing the reflected image onto a dual phototransistor receptor. A servo-amplifier is connected to the output of the dual phototransistor to provide appropriate signals to the carriage drive mechanism to maintain said predetermined distance. The servo-amplifier utilizes both positional and rate feedback to provide faster operation and settling. The inclusive angle between the light source and the photodetector is substantially reduced providing for a more compact and reliable system.

24 Claims, 12 Drawing Figures

AUTOMATIC FOCUSING SYSTEM FOR PROJECTORS

BACKGROUND OF THE INVENTION

1. Field of the Invention

The present invention relates to projectors, and in particular to an automatic focusing system for use with front throw and rear screen slide projectors.

2. Description of the Prior Art

Many systems to provide auto focusing of a projected image of a slide projector have been proposed in the prior art. Generally, these systems require an initial, manual focusing of the first slide in a series, which then sets up a predetermined relationship between the film plane and the projection lens. Reflective mode sensors were utilized in an attempt to maintain said predetermined distance constant during "popping" of heated slides and slide changes. However, in order to operate effectively, the optical angle between the light source and sensor of these prior art systems were, of necessity, substantially greater than 90°, even 120°, in order to provide sufficient reflection. This very large inclusive optical angle would cause problems when glass slides, those in which the film is sandwiched between two thin plates of glass, and regular slides are intermixed in a series. The high optical angle of these prior systems caused reflection off of the front surface of one of the glass plates, and thus, did not maintain proper focus of all of the images during a specific series.

SUMMARY OF THE INVENTION

An object of the present invention is to provide a new and improved auto focusing system for projectors.

Another object of the present invention is to provide a novel photodetector utilizing the optical gain characteristics of a photodetector in order to minimize required external electrical gain.

Another object of the present invention is to provide a photodetector for use in an auto focusing system having a more precisely defined dead band.

Another object of the present invention is to provide a photodetector having a much faster response time than previous photodetectors.

Another object of the present invention is the provision of a servo system utilizing both position and rate feedback to provide much faster operation and settling.

In accordance with the above and other objects, the present invention provides a system for automatically focusing a projected film image by maintaining a predetermined distance, along the optical axis, between the film plane and the projection lens. The system includes a carriage for movably mounting the projection lens and an electro-optic sensor mounted for movement with the carriage for maintaining a constant, predetermined distance. The electro-optic scanner includes means for projecting a beam of light onto the surface of the film and means for focusing the reflected image onto a photodetector. The photodetector comprises a pair of spaced apart phototransistors for indicating deviations from said predetermined distance. A servo-amplifier receives the output of the photodetector to provide appropriate signals to a carriage drive means to maintain said constant, predetermined distance. The servo-amplifier utilizes both positional and rate feedback to provide more rapid focusing and settling. The inclusive optical angle between the light source and the photodetector is substantially reduced providing for a more compact and reliable system capable of accurately focusing throughout a series of slides containing both regular and glass sandwiched slides.

DESCRIPTION OF THE PREFERRED EMBODIMENT

Figure 1:
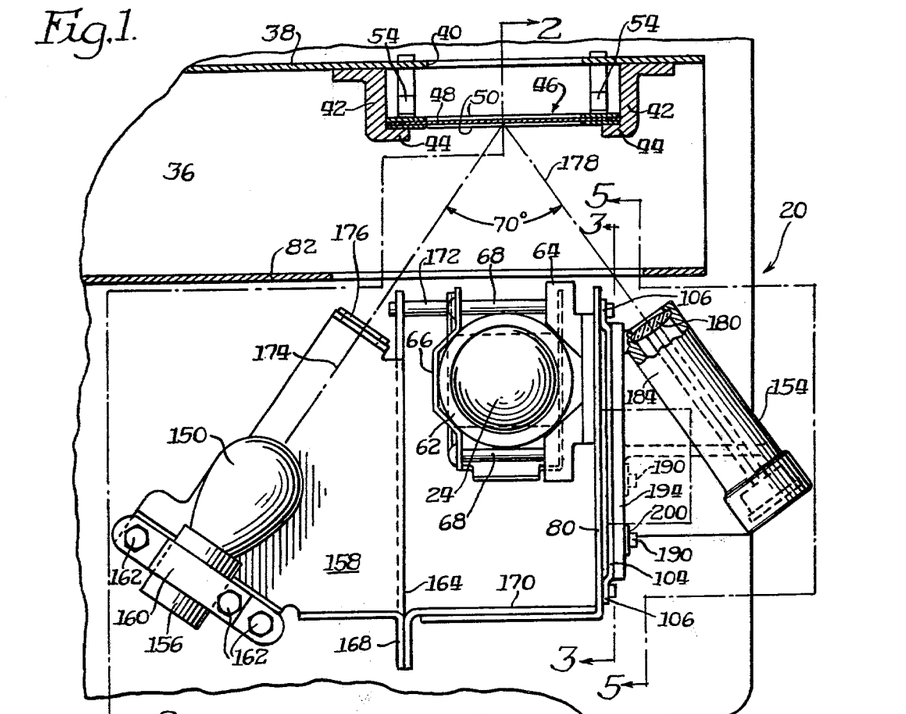
FIG. 1 is a partially fragmented bottom plan view of an automatic focusing system made in accordance with the concepts of the present invention as incorporated in a rear screen projector with remote projection capabilities.
Figure 2:
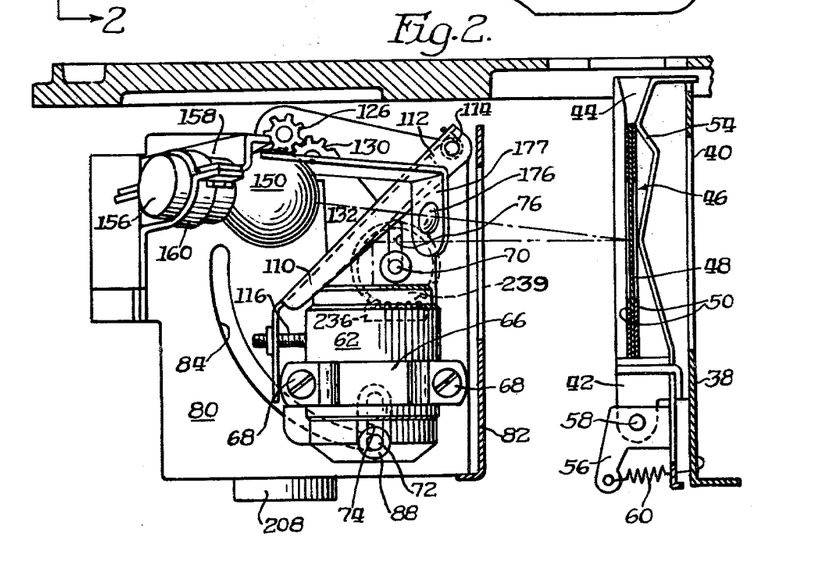
FIG. 2 is a right side elevational view taken generally along line 2—2 of FIG. 1 showing the projection lens in its rear screen projection position.
Figure 3:
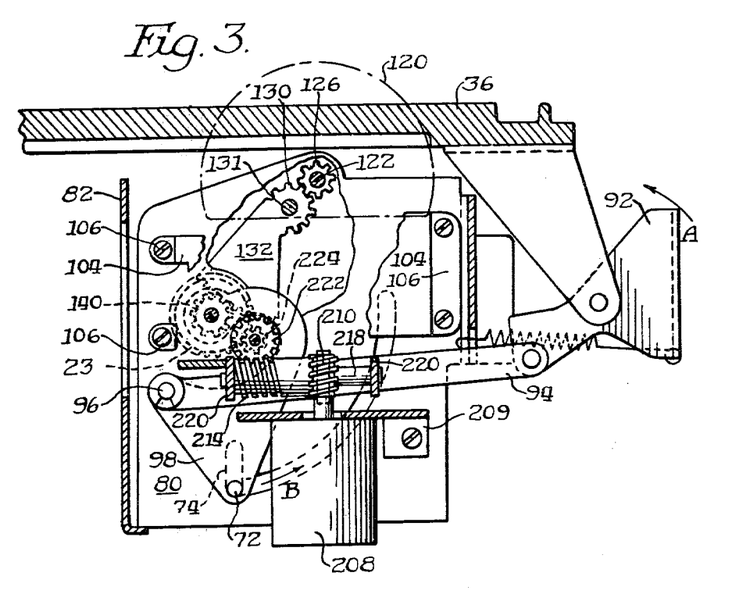
FIG. 3 is a left side elevational view taken generally along line 3—3 of FIG. 1.
Figure 4:
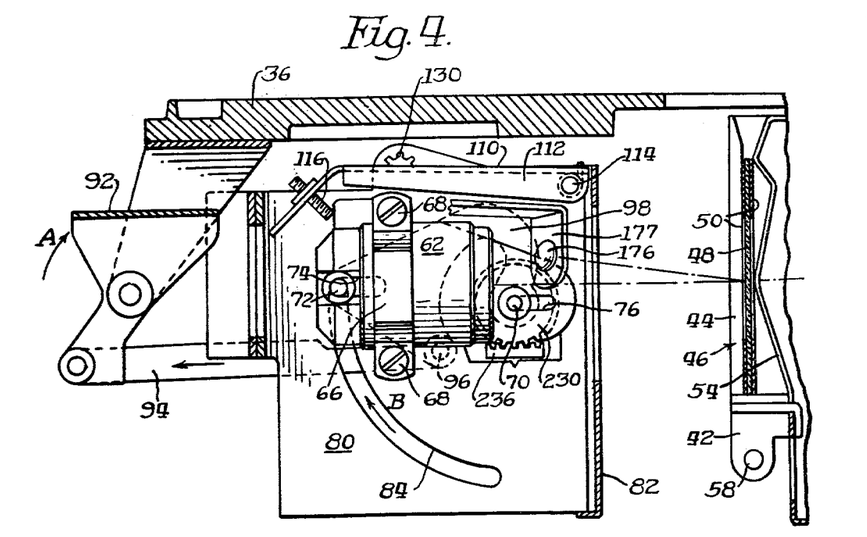
FIG. 4 is a right side elevational view, similar to FIG. 2, showing the projection lens in its remote projection position.
Figure 5:
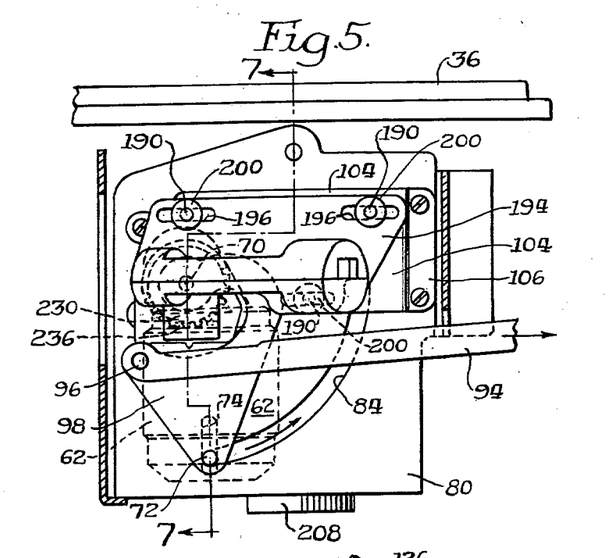
FIG. 5 is a left side elevational view, taken generally along line 5—5 of FIG. 1.

One embodiment of the present invention is shown in FIGS. 1-7, generally designated by the reference numeral 20, in a specific adaptation for use on a rear screen projector with remote or front throw projection capability. In particular, the automatic focusing system 20 is shown mounted on a rear screen projector having remote projection capability as shown in U.S. Pat. No. 4,030,821, assigned to the assignee of the present invention and incorporated herein by reference. In this particular adaptation, the projector has a pivotally mounted movable projection lens 24 which, in its position as shown in FIGS. 1, 2, 3 and 5, projects the image onto a rear screen along an optical path as shown in FIG. 3 of the above patent. As shown in FIG. 4, the projection lens has been rotated 90° relative to FIG. 2 and projects the image through an aperture in the housing onto a remote screen.

The automatic focusing system 20 of the present invention requires that the first slide in a series be manually brought into focus on the remote screen or on the rear screen. Once this is done, a predetermined relationship is established between the plane of the film from which the image is being projected and the projection lens itself. The auto focusing system 20 maintains this predetermined relationship between the film plane and the projection lens throughout the entire series of slides thus focusing each slide as accurately as the first manually focused slide. The system 20 is not capable of providing a clearly focused image from a slide or other transparency which is itself not in focus. However, movement of the slide, due to pressure from the projection lamp cooling fan, expansion or "popping" of the film itself, or from other sources, is automatically compensated for by the auto focusing system 20.

Figure 7:
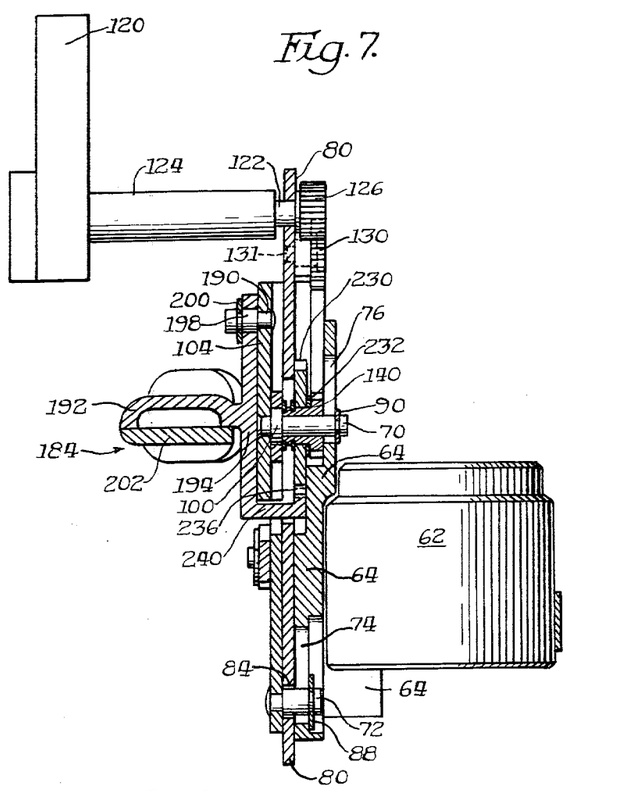
FIG. 7 is a front elevational view, taken generally along line 7—7 of FIG. 5.
Figure 8:
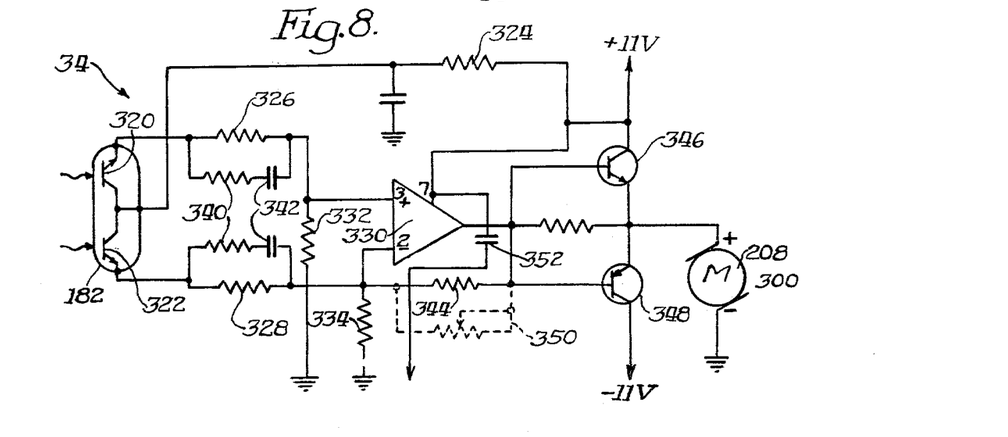
FIG. 8 is an electrical schematic representation of the photodetector, servo-amplifier and carriage drive means of the present invention.

An alternate embodiment, generally designated 30, of the present invention is shown in FIGS. 9-12 in which the auto focusing system has been applied to a projector capable of only remote projection. Thus, with respect to FIGS. 1-7, the embodiment of the invention as shown therein is capable of maintaining focused projection of slides in either the rear screen or remote projection mode. However, with respect to FIGS. 9-12, the system is adapted to a single mode projector. FIG. 8 shows a control means 34 for use with either of the embodiments 20 or 30 of the present invention for moving the projection lens to maintain its predetermined spatial relationship with the film plane of the slide being projected.

Referring particularly to FIG. 1, the projector includes an upper surface or top wall 36 of the housing to which the projection lens assembly and automatic focusing system 20 are mounted. The top wall 36 mounts a vertical wall or plate 38 for supporting the slides. The wall 38 includes a rectangular aperture 40 centered on the optical axis. A pair of vertical guide rails 42 on either side of the optical axis are provided with inwardly directed legs 44 which define the front surface for engagement of an image carrier such as the slide, generally designated 46. The slide 46 includes a central image carrying element, the film itself, which is sandwiched between a pair of rectangular cardboard or plastic holders, each having a rectangular opening in the center thereof providing the transparency. The edges 50 of the slide are maintained in flush abutment with the front surfaces 44 of the legs, normal to the optical axis, by a pair of biased tension members 54. The tension members 54 are mounted by a pair of ears 56 for pivotal movement about a pin 58 formed on the guides 42. A spring means 60 biases the members 54 into engagement with the periphery of the slide 46 to maintain the slide 46 in a plane normal to the optical axis.

The lens 24 is mounted within a lens barrel 62 for pivotal movement between its positions as shown in FIGS. 2 and 4, as previously described. The lens barrel is mounted in a predetermined position within a V-shaped seat 64 by a clamp 66 and screws 68 on opposite sides of the lens barrel 62. The lens carriage 64 is shown more clearly in a perspective view in FIG. 6. The lens carriage 64 is mounted for pivotal movement about the pin 70. The opposite end of the carriage is mounted by a second pin 72. A pair of slots 74 and 76 permit the carriage 64 to move relative to the pins 72 and 70, respectively, for adjustment along the optical axis toward and away from the film 48 of the slide.

The lens carriage mechanism as described above is movably mounted to a mechanism support plate 80 secured to the top 36 of the housing by a rear wall plate 82 lying in a plane generally parallel to the slide support wall 38 described above. The mechanism support plate 80 includes an arcuate slot 84 in which the pin 72, referring to FIG. 7, rides in the slot 84 and includes a washer 88, which is secured by a press fit or other means. Similarly, a washer 90 on the lens side of the pin 70 maintains the carriage 64 on the pin. The carriage itself 64 is then free to travel relative to the pins 70 and 72 by virtue of the slots 76 and 74, respectively.

As described in U.S. Pat. No. 4,030,821, a pivotally mounted access door 92 on the front of the housing is connected by a link 94 to a pivot pin 96 on a generally J-shaped lens shifting plate 98. The shifting plate 98 is modified slightly from that shown in the foregoing patent because of the additional elements in the auto focusing mechanism. However, the operation is substantially the same as that described in the foregoing patent. The J-shaped shift plate is pivotally mounted at its inner end to an enlarged diameter portion 100 of the pin 70 previously identified. The pin 70 is secured by staking to a stationary bracket 104 (FIG. 7) which is spaced from the mechanism support plate 80 by a pair of flanges 106 on either end as shown more clearly in FIG. 1. Thus, the spacing between the mechanism support plate 80 and the spacer plate 104 is substantially equal to the axial length of the enlarged diameter portion 100 of the pivot pin 70.

Referring to FIGS. 3 and 4, as the access door 92 is rotated upwardly in the direction of arrow A, the connecting link 94 rotates the pin 92 within the slot 84 upwardly in the direction of arrow B. This upward pivotal movement, through the pin connection to the lens carriage 74, through the slot 84, rotates the lens from the downwardly directed rear screen projection position as shown in FIGS. 1, 2, 3 and 5 to the remote projection position as shown in FIG. 4. The optical axis through the projection lens 24 is then through the aperture in the housing onto a remote screen. A more detailed explanation and description of this operation is shown in the aforementioned patent which has been incorporated herein by reference.

When the projector is in the rear screen projection position, the optical path is redirected to an angle of 90° by a mirror 110 which is secured to a pivotal frame 112. The frame 112 is pivotally mounted by a pin 114 for movement between a generally horizontal position as shown in FIG. 4 to an angle of approximately 45° with the horizontal as shown in FIG. 2. An adjustment/set screw 116 in the frame 110 engages the lens barrel 62 and is automatically moved between its respective positions by shifting of the access door 92 described above and in the prior patent.

Figure 6:
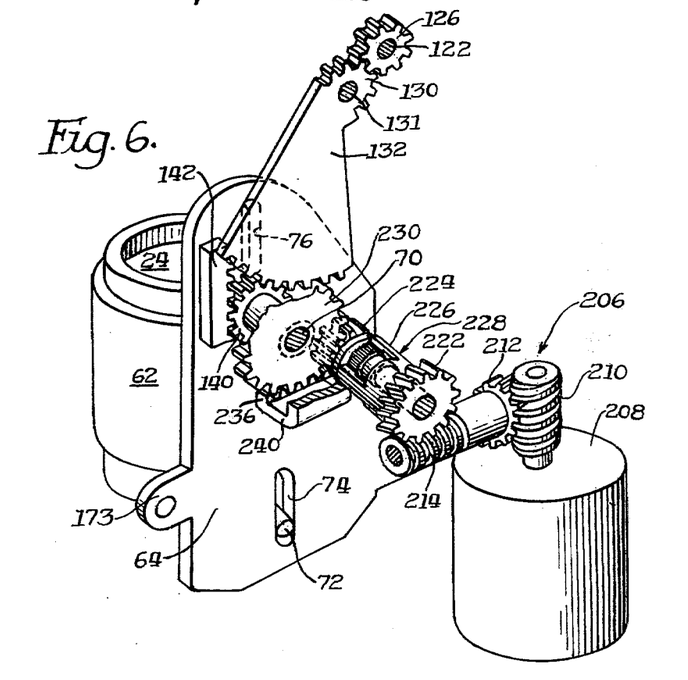
FIG. 6 is a perspective view of the projection lens and carriage drive means.

As pointed out above, initial focusing of the first slide of a presentation is required to establish the predetermined relationship between the projection lens and the film 48. The manual focusing is described in the prior patent and is described below for convenience. More specifically, referring to FIGS. 1-7, the manual focusing is controlled by a focusing knob 120 which extends above the top surface 36 of the housing. The focusing knob 120 is connected by a shaft 122 rotatably mounted within a bushing 124 secured to the housing. The inner end of the shaft 122 carries a pinion gear 126 for conjoint rotation with the shaft. The pinion gear 126 engages a partial or arcuate gear section 130 pivotally mounted by a set screw or shaft 131 to the mechanism support plate 80. The gear section 130 is integrally molded with a substantially larger gear section 132 as seen clearly in FIG. 6. The larger gear section 132 is in meshing engagement with a focusing gear 140 rotatably mounted on the pin 70 generally adjacent the slot 76 (FIG. 7). The focusing gear 140 is in meshing engagement with a focusing rack 142, as best seen in FIG. 6, which is integrally molded with the lens carriage 64 to move the lens along its optical axis upon rotation of the focusing gear 140. Thus, for focusing in either the rear screen projection mode or the remote projection mode, rotation of the focusing knob 120 will move the lens along its optical axis. For example, with respect to the rear screen projection position as shown in FIGS. 1, 2, 3, 5 and 6, the lens 24 will move up and down in the vertical direction. In the remote projection mode, as shown in FIG. 4, the lens will move along the horizontal optical axis for focusing on a remote screen. When the access door 92 is open or closed, there is normally no rotation of the focusing gear 140 since this gear 140 rotates about the axis which defines the pivot point for rotation of the lens carriage and thus, the gear 142 merely rolls along the surface of the gear 140 without causing it to rotate. This is not to say that an image which is focused on a remote screen would necessarily be focused on the rear screen after the access door is closed and therefore refocusing after a change of mode may be required. In addition, a controlled amount of lost motion or slip must be provided between the manual focusing mechanism, as described above, and the automatic focusing mechanism, to be described in detail hereinafter, since both mechanisms are designed to move the projection lens relative to the film plane. When the manual focusing knob is utilized for initial focusing, movement of the lens is required relative to the carriage drive mechanism of the automatic focusing elements. Therefore, a slip clutch is provided and will be described in detail with respect to the elements of the auto focusing mechanism.

In this first embodiment, as shown in FIGS. 1-7, the projection lens 24 is movable between a position with its axis normal to the film plane and a rear screen projection position with its axis parallel to the film plane. Since the lens is movable in this manner, the electro-optic elements of the automatic focusing mechanism cannot be mounted on the lens or lens carriage for movement therewith.

More specifically, the electro-optic elements of the auto focusing mechanism include a lightbulb 150 and means for detecting reflected light such as a photodetector or receptor 154. The lightbulb 150 is mounted through its socket 156 to a stationary plate 158 by a clamp 160 and a plurality of nuts or screws 162. The stationary plate 158 includes a generally vertical plate 164 which is secured at one end by a flange 168 to a right angle extension 170 of the mechanism support plate 80. The opposite end of the vertical portion 164 is secured by appropriate spacers and bolts 172 solidly to the housing. Thus the lightbulb 150 is completely immobile. The light generated by the lightbulb 150 is projected along an emanating axis 174 and focused by a lens 176 onto the plane of the front surface of the film 48. The light is reflected along a reflected axis 178 and through a focusing lens 180 onto a photodetector in the form of a dual phototransistor 182 mounted within a tubular housing 184 of the receptor 154.

The photodetector 182 includes a pair of photodetectors each of which are generally rectangular in shape. The active area of each phototransistor is approximately 0.406 centimeters by 0.122 centimeters providing an active area of approximately 0.050 square centimeters. Each phototransistor is mounted with one of its 0.122 centimeter sides aligned with one another and spaced apart by approximately 0.015" therebetween. This center 0.015" is designated as a null area and the image of the reflected light from the lightbulb extends partially into each of the phototransistor areas. During manufacture, the lens 24 and barrel 62 are mounted within the lens carriage such that a predetermined relationship is established between the projection lens 24 and the film plane 48 when the reflected light of the optical sensor is evenly balanced on the two phototransistors. As will be described in detail hereinafter with respect to FIG. 8, a servo-amplifier is utilized to maintain equilibrium on the photodetector 182 to maintain the predetermined relationship.

However, in the embodiment of FIGS. 1-7, since the light source 150 is stationary, when the projection lens moves, the phototransistor must be moved in a 2:1 ratio therewith to maintain equilibrium. Since the angle between the emitted light axis 174 and reflected light axis 178 remains constant, the position of the photodetector 182 is moved to maintain equilibrium between the two phototransistors. To this end, the tubular housing 184 is mounted for movement on the mechanism support plate 80. Specifically, the spacer plate 104, as previously described, provides a surface on which the photodetector is movably mounted. A pair of pins 190 (FIG. 5) are mounted on the spacer plate 104 to support the photodetector housing 184. The housing includes substantially an upper circular portion 192 which is integrally molded with a vertical planar portion 194 mounted on the pins 190. The planar portion 194 includes a pair of generally horizontal longitudinal slots 196 mounted on an enlarged shoulder portion 198 of each pin 190. Suitable washers 200 maintain the housing on the pins 190. Thus, the phototransistor is mounted for movement toward and away from the film plane, on an axis defined by the pins, which is parallel to the optical axis and normal to the film plane. Thus, movement of the housing 184 will cause the reflected light path 178 to sweep the two phototransistors. A lower housing or closure portion 202 permits insertion and removal of the lens 180 and photodetector 182.

Drive means, generally designated 206 (FIG. 6), is provided for movement of the lens carriage 64 as dictated by the control means 34. More specifically, the carriage automatic drive means includes a drive motor 208 and a worm gear 210 secured to its output shaft. The worm gear 210 engages a pinion gear 212 secured to a second worm gear 214. The pinion gear 212 and worm gear 214 are rotatably mounted by a shaft 218 (FIG. 3) mounted by a pair of flanges 220 to the housing. A second worm pinion gear 222 engages the second worm gear 214 and is connected to a pinion gear 224 on the inner end of a shaft (not shown) rotatably mounted within the journal 226, which is also secured to the housing. Gears 222 and 224 are separate parts on the same shaft, each with teeth engageable with one another as shown at 228 to form a safety clutch which is provided in case a slide is inserted incorrectly into the loading station or electrical failure occurs. Finally, the pinion gear 224 is in engagement with a photocell drive gear 230 shown in FIGS. 6 and 7. The photocell drive gear 230 is rotatably mounted on a reduced diameter, shoulder portion of the focusing gear 140 as seen particularly in FIG. 7. However, as described previously, a predetermined amount of lost motion or slippage is required between the focusing gear 140 and the phototransistor drive gear 230. This slippage is provided by a clutch 232 between the adjacent faces of the respective gears 140 and 230 to permit slippage between the two gears during manual focusing. Thus, during initial setup and manually focusing by the focusing knob 120, the focusing gear 140 moves relative to the phototransistor drive gear 230 by virtue of the clutch 232. The clutch 232 is preferably a soft, rubber-type flexible washer which is biased to provide sufficient pressure and thus conjoint rotation between the two gears. During initial manual focusing, the photocell drive gear is locked by virtue of the gear train leading to the motor 208. Thus, slippage is easily accomplished. However, subsequent operation of the automatic focusing mechanism allows the motor 208 to drive the phototransistor drive gear 230 and, through the clutch 232, to drive the focusing gear 140 to move the lens 24 relative to the film plane.

The photocell drive gear 230 as seen in FIGS. 4, 6 and 7, is in engagement with a rack 236 integrally connected to the planar portion 194 of the phototransistor housing 184. The rack is mounted on a U-shaped section 240 which is shown as being fragmented in FIG. 6 for clarity. Thus, as the drive motor 208 rotates the gear 230 and focus gear 140 to move the projection lens to its predetermined position relative to the film plane, the drive gear 230 through the rack 236 simultaneously moves the photodetector housing 194. Energization of the drive motor 208 continues until equilibrium is reached between the dual phototransistors. The relative size between the phototransistor drive gear 230 and the focusing gear 140 is exactly a 2:1 relationship so that the phototransistors are caused to move exactly twice the distance the lens is moved by the focusing gear 140.

The movement of the projection lens 24 relative to the film plane is by the same drive mechanism regardless of whether it is in the rear screen projection position or the remote screen projection position. This is accomplished by the mounting of the rack 142, which moves the lens carriage 64, at a position relative to the axis of the pin 170 equal to the radial dimension of the focusing gear 140. Thus, when shifting between the rear screen projection position of FIG. 6, and the forward or remote screen projection position of FIG. 4, the rack 142 merely rotates around the axis of the pin 170 maintaining engagement with the gear 140.

The physical positioning of the auto focus lightbulb 150 and receptor or photodetector 182 displays a marked departure from the prior art in this field. Notably, the angle between the light source 150 and the photodetector 182 has been made very small, approximately 70° as shown in FIG. 1 of the previously described embodiment and FIG. 11 of the alternate embodiment. Typically, attempts to provide automatic focusing mechanisms have required a very large angle between these elements, some as large as 120° or greater. Most commonly, the two reasons for the large angle between the sensor elements was to provide sufficient reflection from the surface of the image carrier and also to prevent extraneous projection lamp light from entering or impinging upon the photodetector. One reason that a large amount of light was required was because the photodetectors of prior art units were generally cadmium cells which have very slow response and low output. In addition, these cadmium cells generally had a very roughly defined dead band area and the output was so small that there was, in effect, an electrical dead band to which the amplifier could not respond. In the present invention, as described in detail hereinafter with respect to FIG. 8, the servoamplifier has no electrical dead band since it senses millivolt changes from the photodetector 182. In addition, the photodetector 182 has a response which is several orders of magnitude faster than prior cadmium cells. In addition, much jitter was caused in prior art systems since the electrical gain required with the cadmium selenide cells was in the range of 20,000 while the gain required in the present invention is on the order of approximately 5. Thus, the system can operate much more rapidly and the elements of the sensor can be placed closer to one another on the 70° angle.

The provision of the 70° angle between the light source 150 and photodetector 182 permits correct focusing in a series of slides containing both regular and glass sandwiched slides. The reason for this is that the emanated light path 174 passes through the glass cover and is reflected by the surface of the film emulsion to the receptor or photodetector 182 in a similar manner as regular slides. On prior art slide projectors, having an angle in the neighborhood of 120°, the emanated light beam 174 would be reflected from the front surface of the glass of the slide and thus the physical relationship of the film plane would be in error by the approximate thickness of the glass. This was sometimes considered to be a very minor problem since the automatic focusing system would operate to focus glass slides from the surface of the glass, but, only in those instances where the thickness of the glass cover was the same for all of the slides and when no glass slides were intermixed with regular slides. The smaller optical angle of the present invention permits the intermixing of glass and regular slides.

The smaller optical angle, 70°, of the sensor requires that the photodetector 182 be placed much closer to the optical axis than in previous devices. Since it is possible that spurious light rays from the projection lamp could impinge the photodetector, the present invention incorporates the use of an infrared filter (not shown) in front of the photodetector 182 which essentially causes the focusing system to operate on infrared signals only. Since the glowing filament of the auto focus lightbulb 150 contains a large amount of infrared signal, the signal-to-noise ratio between that signal and all other signals received by the photodetector is very high and sufficient to provide an extremely stable system. The transmission of the infrared filter peaks and levels off around 8500 A and this frequency coincides almost exactly with the peak response of the silicon phototransistors at about 9000 A. Since prior art devices using cadmium-type or cadmium selenide cells which had a very sharp peak response at approximately 6500 A, it can be seen that the use of an infrared filter would be of very little benefit. Consequently, considering optical characteristics only, the output current of the phototransistors is approximately 200 times the output of the prior cadmium selenide cells. As described above, this higher sensor output provides "optical gain" characteristics which then require less electrical gain in the control circuit. In addition, this system is less costly and more efficient than one using an infrared light source because of the larger expense of infrared sources. The use of an infrared source would not prevent extraneous projection lamp light from affecting the output of the photodetector.

The alternate embodiment 30 of the present invention, as shown in FIGS. 9–12, relates to a slide projector having only one mode of operation, a remote projection mode. Many of the components of the alternate embodiment are the same elements as described previously with the first embodiment and like numerals will be utilized to identify like elements. In this alternate embodiment, since the projection lens 24 is not movable between two projection mode positions, the light source 150 and the photodetector 182 can be mounted for movement with the lens 24. More specifically, the lens 24 is mounted within a tubular housing or barrel 250. The barrel 250 is mounted to a carriage 252 which is mounted for sliding movement upon a pair of circular guide rods 254. The guide rods 254 are mounted within ears 256 formed integrally with a lens mounting bracket 260 secured by four bosses or protrusions 262 to the top surface 266 of the housing of the projector. Each of the guide rods 254 includes a suitable locking means such as a washer 268 on the outside of the ears 256 to prevent relative movement of the rods and the frame 260. In the preferred embodiment, the lens barrel 250 typically includes four generally downwardly directed ears 270 each of which is provided with a close tolerance aperture for relative movement of the lens within the housing.

In this embodiment, the lens barrel 250 is axially movable within the lens housing or carriage 252 to provide initial focusing on a remote screen. More particularly, referring to FIGS. 10 and 12, the lens barrel 250 is provided with a rack 274 for conjoint axial movement within the housing 252. A focusing knob 276 on the top of the housing is connected to a generally vertical shaft 278 rotatably secured within a journal 280 provided on the lens carriage 252. The shaft 278 is provided with a focusing pinion gear 283 which meshes with the rack 274 and permits manual movement of the lens toward and away from the film plane by convenient manual rotation of the knob 276. Thus, initial focusing is accomplished by rotation of the know 276 after a slide has been inserted in the projector.

In this embodiment, the lens carriage 252 includes a pair of outwardly extending wings 290 for supporting the lightbulb 150 and 292 for supporting the photodetector 182. For economy of manufacture, the wings 290 and 292 may be integrally molded with the housing 252. Again, the system includes a focusing lens 176 in the emanating light path 174 and a second focusing lens 180 in the reflected light path 178. The lens 176 is mounted within a flange 296 directly on the movable housing 252 while the lens 180 is again mounted at one end of the tubular shaft 184 supporting the photodetector 182. Both elements, the lightbulb 150 and the photodetector 182 are thus mounted for simultaneous translatory movement with the movement of the housing 252. This alternate embodiment 30 is thus less complicated than the prior embodiment since both the lightbulb and photodetector move on a 1:1 basis with the housing 252 and thus the lens 24 after initial focusing.

Figure 9:
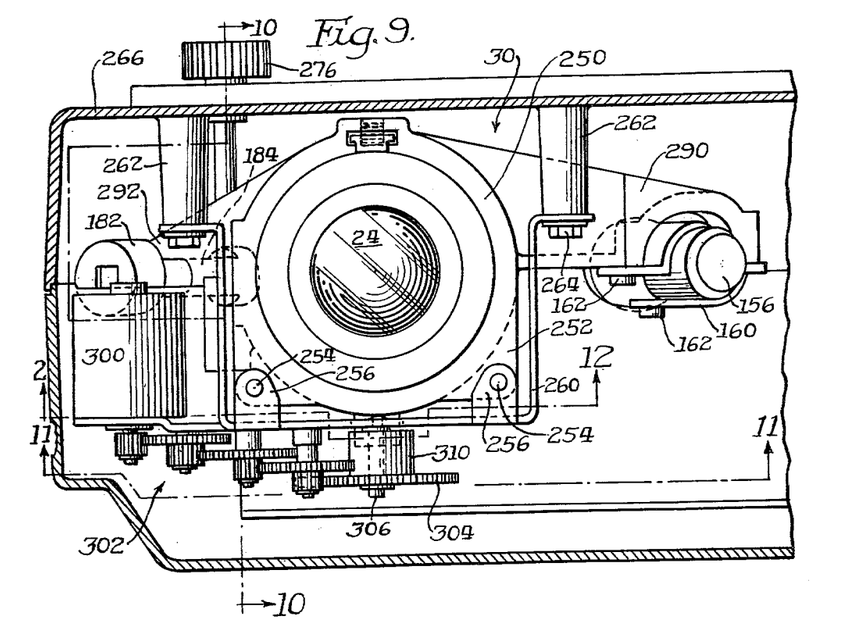
FIG. 9 is a front elevational view of an alternate embodiment of an automatic focusing system made in accordance with the concepts of the present invention.
Figure 10:
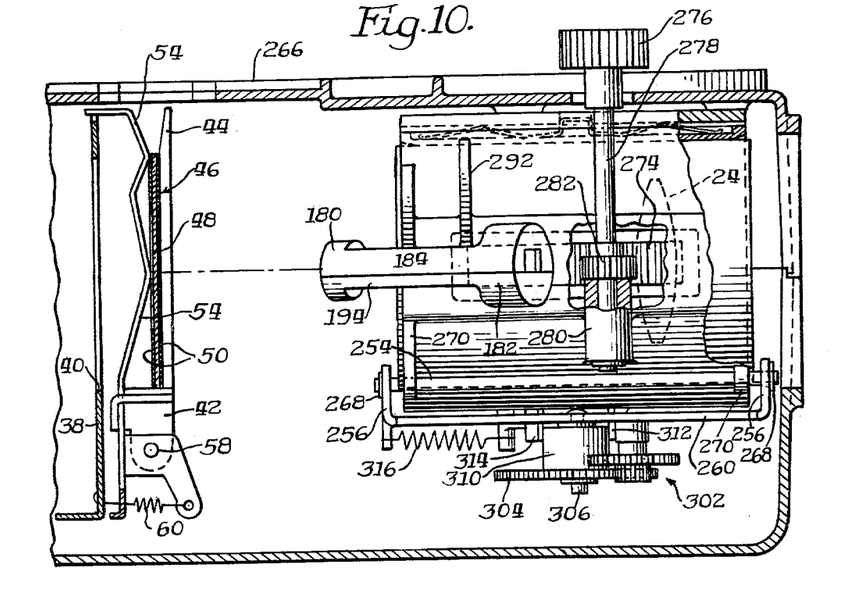
FIG. 10 is a right side elevational view taken generally along line 10—10 of FIG. 9.
Figure 11:
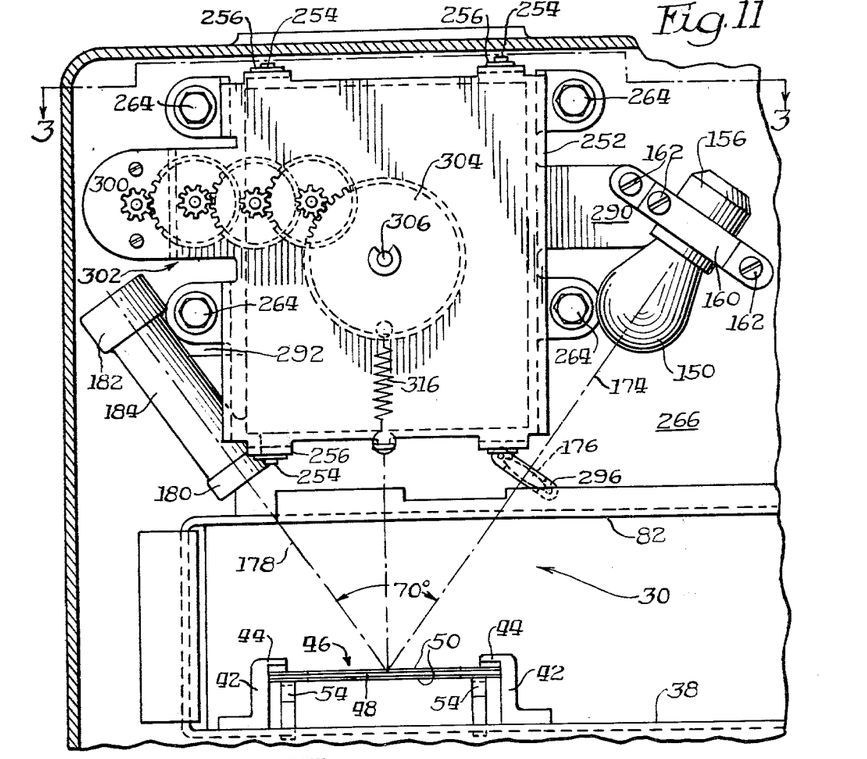
FIG. 11 is a bottom plan view taken generally along line 11—11 of FIG. 9.
Figure 12:
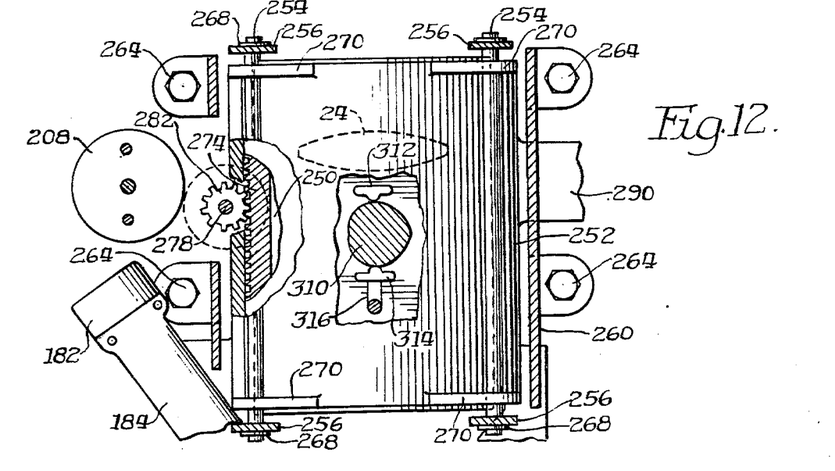
FIG. 12 is another bottom plan view, similar to FIG. 11, taken generally along line 12—12 of FIG. 9.

The carriage drive means includes the drive motor 208 secured to the lens mouting bracket 260 and through a plurality of four sets of pinion gears and follower gears defining a gear train 302, drives a main auto focusing or carriage drive gear 304 mounted on the underside of the housing support frame 260. Each set of pinion gears is rotatably mounted on a shaft securd to the carriage 260 by appropriate means. The gear train 302 operates to provide a substantial stepdown in angular rotation so that the focusing gear 304 rotates at a relatively slow rate. The focusing gear 304 is self-secured by a suitable shaft 306 to the bottom of the support bracket 260 as shown in FIGS. 9 and 10. The drive gear 304 is conjointly rotatably mounted, or preferably integraly molded, with a heart-shaped drive cam 310 as shown in cross-sectional view in FIG. 12. The cam 310 is in constant engagement with two cam followers 312 and 314 on opposite sides thereof having their cam contact point lying in a vertical plane generally including the optical axis of the lens. The cam followers 312 and 314 are secured to or preferably molded with the lens carriage 252 and extend through appropriate openings 315 in the bottom of the bracket 260 into engagement with the cam 310. Thus, as the cam 310 rotates, the lens carriage 252 will be moved toward or away from the film plane until the equilibrium required by the photodetector is satisfied. Biasing means 316 between the housing and mounting bracket 260 maintains the lens housing biased toward the film plane. Thus, the predetermined relationship between the film plane and the projection lens will be maintained irrespective of the movement of the slide due to warpage, heating, thickness of the cardboard or plastic mount, and focus of the image will be maintained throughout the entire presentation.

The energization and direction of rotation of the cam 310 and drive motor 208 is described hereinafter with respect to FIG. 8 and is substantially identical thereto for this embodiment. Again, as described previously with respect to the prior embodiment, the smaller optical axis, approximately 70°, as used in this design enables accurate reflection from the emulsion surface of the film regardless of whether or not the slides are sandwiched between pieces of glass. Thus, focus will be maintained even during a presentation including a mixture of regular and glass slides. Similarly, the heretofore described advantages of the improved more rapid, response time of the phototransistors, and the reduction in required gain, external to the photodetector, are also enjoyed by this alternate embodiment.

The control means 34 which operates the auto focusing mechanisms in both embodiments is shown in FIG. 8. The photodetector 182 is shown on the left to include two phototransistors 320 and 322. The collectors of the two phototransistors are connected through a resistor 324 to an 11 volt DC source. As pointed out previously, the physical and electrical design of the present auto focusing mechanism is specifically adapted for quick response to rapidly bring the image into focus while, at the same time, being very stable and settling quickly. To this end, the circuitry includes positional and rate feedback. The emitters of each of the transistors 320 and 322 are connected in series with resistors 326 and 328, respectively, to the noninverted and inverted inputs of an OP-amp 330. A pair of resistors 332 and 334 form a voltage divider for each input with the resistors 326 and 328 respectively wherein the resistance values are approximately on a 10:1 ratio. An RC circuit including resistor 340 and capacitors 342 are connected in parallel with the resistors 326 and 328 as shown. Typically, the capacitors act as an open circuit for DC currents through the resistors 326 and 328 such as those currents normally encountered when the reflected light impinging the photodetector 182 is slightly off-balance between the two photodetectors 320 and 322. However, when the light impinging the photodetector is moving a rapid change in the output of the emitter acts similar to an AC current in which case the capacitors 342 act as short circuits, thus connecting the resistors 340 in parallel with the resistors 326 and 328. The resistors 340 typically are of a much smaller resistance value, approximately 20% of the resistors 326 and 328 so that the total resistance of the parallel connection is approximately 20% of the resistance values of the resistors 326 and 328. Thus, alternating current signals representative of rate changes provide an input to the respective inverted and non-inverted terminals of the OP-amp 330 which is substantially greater than DC or positional changes. As described, rate changes are related to positional changes on a 5:1 ratio. The OP-amp 330 includes a feedback circuit having a resistor 344 in the series therewith which lowers the gain of the OP-amp to approximately 50. The small gain provides stability within the system and with the high output of the phototransistors 320 and 322 provides sufficient speed of operation. The output of the OP-amp is connected to the base of two current pump transistors, an NPN transistor 346 and a PNP transistor 348. The collector of the NPN transistor is connected to a positive 11 volt source while the collector of the PNP transistor is connected to a negative 11 volt DC source. Thus, when either one of the transistors is turned on, they will provide a positive or negative current supply to the motor 208. For example, when the output of the OP-amp 330 goes positive, the NPN transistor 330 turns on to provide a plus 11 volt supply to the motor 208. Conversely, if the output of the OP-amp is negative, the PNP transistor 348 is turned on providing a negative supply to the motor which then rotates in the opposite way. The terminal connections to the motor are such that it moves the phototransistors 320 and 322 in a direction which attempts to null the output of the OP-amp 330.

While the feedback resistor 344 has been described as providing a gain of 50 for the OP-amp 330, it is also contemplated that a variable resistor circuit 350, shown in dotted lines, could replace the resistor 344 to permit variation of the OP-amp gain according to the particular needs of a user or other component characteristics. A small capacitor 352 is connected across the OP-amp 330 to eliminate effects of high frequency spikes. In addition, the circuitry and connections as described make use of the OP-amp's common mode rejection to eliminate system jitter due to such sources as lamp source nigrescence and other noise. Since the servo-amplifier utilizes both positional and rate components, it operates quickly and yet the gain is small enough so that it can settle very rapidly when in focus.

The foregoing detailed description has been given for clearness of understanding only and no unnecessary limitations should be understood therefrom as some modifications will be obvious to those skilled in the art.

We claim:

1. A system for use on a projector providing automatic focus of a projected image, comprising:
    a housing including a projection lens for projecting an image from an image carrier;
    an electro-optic sensor having a light source and a photodetector;
    first means mounting said electro-optic sensor for providing a reflected focusing light beam on an image carrier for reflection onto said photodetector;
    second means mounting said projection lens for movement relative to the image carrier, said lens being mounted by said second means on the housing for movement perpendicular to the image carrier, in a plane parallel to the plane of the image carrier and for movement about a pivot axis for pivotal movement relative to the image carrier;
    third means for mounting at least a portion of the electro-optic sensor for movement in a 2:1 ratio simultaneously with the projection lens; and
    control means responsive to the output of said electro-optic sensor for maintaining a predetermined relationship between said projection lens and said image carrier, said control means including a lens drive means and circuit means connected between said lens drive means and said electro-optic sensor for maintaining said predetermined relationship, said lens drive means further including a motor mounted on the housing and drivingly connected to said second means, said driving connection including lost motion means in the form of a slip clutch mounted on the pivot axis for permitting a predetermined amount of relative pivotal movement between the lens and said motor to permit automatic focusing of said image in either of said lens positions.

2. The system of claim 1 wherein said electro-optic sensor includes a pair of phototransistors mounted adjacent one another and spaced apart to provide a dead band area therebetween.

3. The system of claim 2 wherein said circuit means includes a servo-amplifier connected between said sensor output and said lens carriage drive means for energizing said drive means for movement of the projection lens in a predetermined direction whereby the photodetector nulls the output of said servo-amplifier as the reflected focusing light beam impinges said dead band area.

4. The system of claim 3 including an infrared filter in the path of said reflected focusing light beam.

5. The system of claim 4 wherein the angle between the focusing light beam and reflected focusing light beam is substantially less than 90°.

6. The system of claim 5 wherein the angle between said focusing light beam and said reflected focusing light beam is approximately 70°.

7. In a slide projector for projection of an image from a slide alternatively onto a remote screen and a built-in screen, an automatic focusing system, comprising:
    a projection lens;
    focusing means for establishing a predetermined relationship between the slide and said projection lens along the optical axis in either of said first or second positions, said focusing means including a focusing gear and a rack in meshing engagement therewith for movement relative to said pivot axis;
    a lens carriage means supporting said projection lens said being mounted for pivotal movement about the rotational axis of the focusing gear between a first position for projection of an image onto a remote surface and a second position for projection of an image onto a built-in screen; and
    means connected to said focusing gear for automatically maintaining said predetermined relationship between said slide and said projection lens comprising an electro-optic sensor including a light source and a photodetector, at least one portion of said electro-optic sensor being mounted for movement simultaneously with the projection lens and control means responsive to the output of said electro-optic sensor for maintaining said predetermined relationship.

8. The system of claim 7 wherein said focusing gear is connected to said focusing means for manual rotation thereof to establish said predetermined relationship and by a lost motion drive means to said means for establishing a predetermined relationship for movement thereby in response to said control means.

9. The system of claim 8 wherein said lost motion drive means comprises a slip clutch between said focusing gear and a photodetector drive gear for moving said projection lens and said photodetector in response to said control means.

10. The system of claim 9 wherein said photodetector drive gear and focusing drive gear are sized on a two to one relationship to provide for movement of the photodetector and the focusing lens on a two to one ratio.

11. The system of claim 10 wherein said electro-optic sensor includes a pair of phototransistors mounted adjacent one another and spaced apart to provide a dead band area therebetween.

12. The system of claim 11 wherein said circuit means includes a servo-amplifier connected between said sensor output and said lens carriage drive means for energizing said drive means for movement of the projection lens in a predetermined direction whereby the photodetector nulls the output of said servo-amplifier as the reflected focusing light beam impinges said dead band area.

13. The system of claim 12 including filter means in the path of said reflected focusing light beam for substantially eliminating the effect of the projection light source on the electro-optic sensor.

14. The system of claim 13 wherein the angle between said focusing light beam and said reflected focusing light beam is approximately 70°.

15. The system of claim 12 wherein the servo-amplifier includes inputs having both positional and rate components correlated to the impingement of the reflected focusing light beam on the sensor.

16. The system of claim 15 wherein the output of the servo-amplifier is connected to a pair of current pumps to provide the necessary polarity current to the lens carriage drive means to null the output of the servo-amplifier.

17. In a slide projector for projection of an image from a slide alternatively onto a remote surface and a built-in screen, an automatic focusing system, comprising:
a housing including a slide handling mechanism and a projection means for projecting an image from a slide along a projection axis;
a focusable projection lens;
a lens carriage means supporting said projection lens, said lens carriage being mounted for pivotal movement about a pivot axis between a first position for projection of an image along one optical axis onto a remote screen and a second position for projection of an image along a second optical axis onto a built-in screen;
focusing means mounting said lens carriage for translatory movement relative to said pivotal axis to permit establishment of a predetermined relationship between the slide and the projection lens along one of two optical axes;
an electro-optic sensor having a stationary light source secured to said housing and a photodetector oriented relative to the light source to provide a focusing light beam directed from the light source to the slide to produce a reflected focusing light beam for impingement upon said photodetector, said photodetector being mounted for movement simultaneously and in a plane parallel with the lens optical axis when in its first position and perpendicular to the optical axis of the lens when in its second position; and
control means responsive to the output of said electro-optic sensor for maintaining a predetermined relationship between said projection lens and said slide along an optical axis, said control means including a rotatable focusing gear engageable with said focusing means to establish said predetermined relationship, a photodetector drive gear for moving the photodetector relative to the lens carriage and a slip clutch coaxially mounted with said focusing gear and said photodetector on the pivot axis of said lens carriage to drive said focusing gear for moving the lens carriage in response to rotation of said photodetector drive gear.

18. The automatic focusing system of claim 17 including an infrared filter in the path of said reflected focusing light beam for substantially eliminating the effect of the projection light source on the electro-optic sensor.

19. The automatic focusing system of claim 18 wherein the angle between the focusing light beam and the reflected focusing light beam is substantially less than 90° to insure reflection of the focusing light beam from the surface of the film regardless of any transparent covering of the slide.

20. The automatic focusing system of claim 19 wherein said angle is approximately 70°.

21. The automatic focusing system of claim 17 wherein said lens carriage includes a rack engageable with said focusing gear for movement in a direction along a tangential line constructed at the point of contact between the focusing gear and said rack.

22. The automatic focusing system of claim 21 wherein said rack is movable with said lens carriage between said first position wherein the tangential line is generally parallel with the projection axis of the projection means and a second position wherein said tangential line is generally normal with respect to the projection axis of said projection means.

23. The automatic focusing system of claim 17 wherein said photodetector mounting means includes a subframe assembly secured to the housing and means mounting the photodetector to the subframe for sliding movement relative thereto and for mounting the photodetector generally within a plane defined by said projection axis and said focusing light beam.

24. The automatic focusing system of claim 17 wherein said first position is at an angle of approximately 90° with respect to said second position.

* * * * *

UNITED STATES PATENT AND TRADEMARK OFFICE
CERTIFICATE OF CORRECTION

PATENT NO. : 4,198,138
DATED : April 15, 1980
INVENTOR(S) : Robert R. Parker and Nicholas Mischenko It is certified that error appears in the above-identified patent and that said Letters Patent are hereby corrected as shown below:

Column 8, line 40, change "8500 A" to --8500 $\overset{\circ}{A}$--;

Column 8, line 42, change "9000 A" to --9000 $\overset{\circ}{A}$--;

Column 8, line 44, change "6500 A" to --6500 $\overset{\circ}{A}$--;

Column 9, line 55, correct spelling of "secured"; and

Claim 7, line 12, delete "said" and insert --and--.

Signed and Sealed this

Eighth Day of September 1981

[SEAL]

Attest:

GERALD J. MOSSINGHOFF

Attesting Officer     Commissioner of Patents and Trademarks